UNITED STATES PATENT OFFICE.

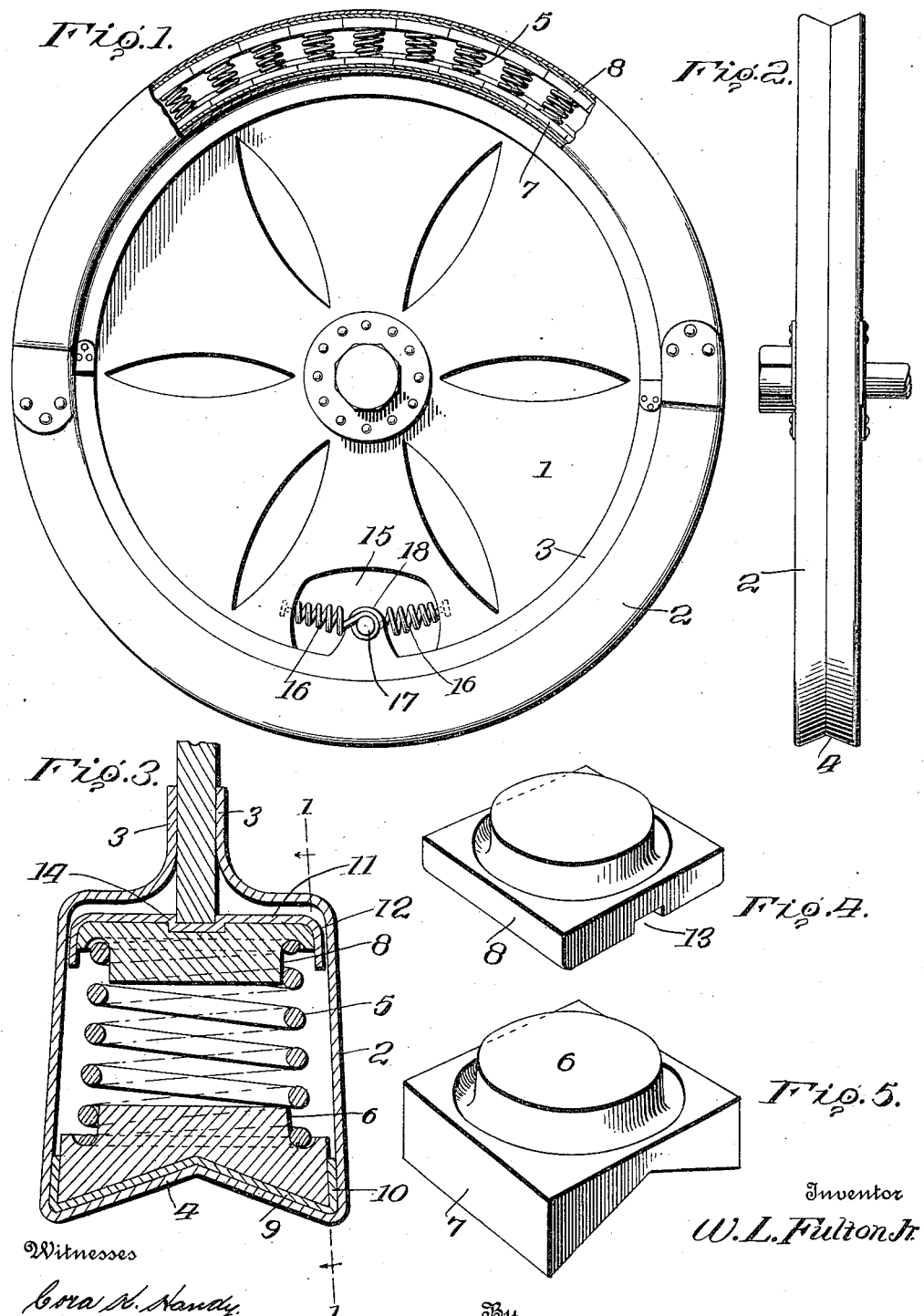

WILLIAM L. FULTON, JR., OF SAVANNAH, GEORGIA.

SPRING-WHEEL.

1,034,438.  Specification of Letters Patent.  Patented Aug. 6, 1912.

Application filed July 28, 1911. Serial No. 641,064.

*To all whom it may concern:*

Be it known that I, WILLIAM L. FULTON, Jr., a citizen of the United States, residing at Savannah, in the county of Chatham and State of Georgia, have invented certain new and useful Improvements in Spring-Wheels, of which the following is a specification.

This invention comprehends certain new and useful improvements in resilient wheels of the type that employ a circumferentially extending series of radially disposed helical springs in the rim portion of the wheel to produce the required yielding effect, instead of employing pneumatic tires that are so liable to become punctured, rim-cut, or otherwise rendered unfit for use, and the invention has for its primary object a simple, durable and efficient construction of wheel of this character, the parts of which may be easily manufactured and assembled. And the invention also aims to generally improve this class of devices and to render them more useful and commercially desirable.

With these and other objects in view, as will more fully appear as the description proceeds, the invention consists of certain constructions, arrangements and combinations of the parts that I shall hereinafter fully describe and claim.

For a full understanding of the invention, reference is to be had to the following description and accompanying drawing in which:

Figure 1 is a side elevation of a wheel constructed in accordance with my invention, a part of the casing being broken out on the line 1—1 of Fig. 3; Fig. 2 is an edge view of the wheel; Fig. 3 is an enlarged detail sectional view; and Figs. 4 and 5 are detail perspective views of spring-holding blocks employed.

Corresponding and like parts are referred to in the following description and indicated in all the views of the accompanying drawing by the same reference characters.

Referring to the drawing, the numeral 1 designates the main central or body portion of my improved resilient wheel, the same being of any desired construction, but in the present instance shown as a metallic disk formed with any desired number of openings to lighten it.

2 designates the rim of the wheel, the same being in the form of a circular casing constructed in two semi-circular sections secured together at their abutting ends in any desired way, said rim casing being formed at its inner side with laterally inturned flanges 3 disposed radially inward and designed to frictionally engage the opposite side faces of the body portions 1 near the margin or outer edge thereof. Preferably the outer edge of the rim casing 2 is recessed or grooved as indicated at 4 so as to facilitate the attachment of a cushion tread element of rubber or the like (not shown) it being understood, however, that when this is used it is only for the purpose of reducing noise and the liability of the wheel to slip or skid, and not for the purpose of producing the required spring or resilient effect.

Within the rim casing 2 are any desired number of helical springs 5 disposed radially as shown in a circumferentially extending series. The outer ends of the springs 5 encircle and are held in place by circular bosses 6 formed in preferably rectangular blocks 7 arranged in abutting relation to each other within and around the outside of the rim, and the inner ends of the springs are correspondingly held by the bosses formed on blocks 8 also arranged in abutting relation to each other within and around the inner side of the rim.

In order to facilitate the assembling of the parts within the rim and to assist in holding the parts in assembled relation to each other, I interpose between the blocks 7 and the outer side of the rim casing 2, a metallic ring 9 shaped, like the outer sides of the blocks 7 to conform to the recessed outer edge of the rim, said ring being formed with inwardly turned side edges 10 interposed between the sides of the blocks 7 and the adjoining walls of the rim; and for the same purpose I encircle the inner set of blocks 8 with a ring 11 having outwardly turned side edges 12 interposed between the sides of the blocks 8 and the adjoining inner wall of the rim. The inner blocks 8 are formed in their inner faces with longitudinally extending recesses 13 in which the outwardly bulged middle portion 14 of the ring 11 fits, this bulged portion of the ring producing an inwardly facing and circumferentially extending circular groove in which the outer margin of the body portion 1 fits.

In order to operatively connect the body portion 1 with the rim casing 2, to secure the proper traction effect while at the same time avoid shocks in starting and stopping the vehicle equipped with wheels of my improved construction, the body portion 1 is formed with any desired number of openings, one being shown in the present instance, designated 15. In this opening oppositely acting contractile springs 16 are mounted, said springs being connected in any desired way at their outer ends to the body portion 1 and being secured at their inner adjoining ends on a transversely extending pin 17 which is fastened in ears 18 which project inwardly from the flanges 3 at the opening 15.

From the foregoing description in connection with the accompanying drawing, the operation of my improved spring wheel will be apparent.

In the practical use of the device, all shocks and movements in a radial direction will be effectively absorbed by the springs 5, the flanges 3 sliding upon the side faces of the body portion 1, in an obvious manner. In stopping and starting, all shocks are absorbed by the springs 16 and their connection to the body portion 1 and rim casing 2, respectively.

What I claim is:

1. A spring wheel, embodying a body portion, a rim casing surrounding the body portion and formed with inwardly extending flanges engaging the side faces of the body portion, a circumferentially extending series of radially disposed helical springs mounted in said casing, blocks set in said casing in abutting relation to each other and holding the outer ends of said springs, corresponding blocks mounted in said casing and holding the inner ends of the springs, the inner blocks being formed with longitudinally extending recesses in circumferential alinement with each other, a ring encircling the inner side of the inner blocks and formed with an outwardly bulged portion producing a groove in which the edge of the body portion fits, and means yieldingly connecting the body portion with the rim casing for a limited movement of one relative to the other in a circumferential direction.

2. A spring wheel, embodying a circular body portion, a rim casing surrounding the body portion and formed with inwardly extending flanges engaging the opposite side faces of the body portion, resilient elements mounted in said rim casing, a ring mounted in said casing within the circle of said resilient elements, and engaging the edge of the body portion, and means yieldingly connecting the body portion to the rim casing for a limited movement of one relative to the other in a circumferential direction.

3. A spring wheel, embodying a circular body portion, a rim casing surrounding the body portion and formed with inwardly extending flanges engaging the opposite side faces of the body portion, resilient elements mounted in said rim casing, a ring mounted in said casing within the circle of said resilient means and engaging the edge of the body portion, the body portion being formed with a marginal opening, contractile springs secured to said body portion within the opening, the casing being formed at said opening with inwardly extending ears, and a pin connecting said ears with the adjoining ends of the springs.

In testimony whereof, I affix my signature in presence of two witnesses.

WILLIAM L. FULTON, Jr. [L. S.]

Witnesses:
N. J. PETERS,
M. J. EGAN, Jr.

---

Copies of this patent may be obtained for five cents each, by addressing the "Commissioner of Patents, Washington, D. C."